(No Model.)
J. F. STEVENS.
CAR BRAKE.
No. 511,973.
Patented Jan. 2, 1894.
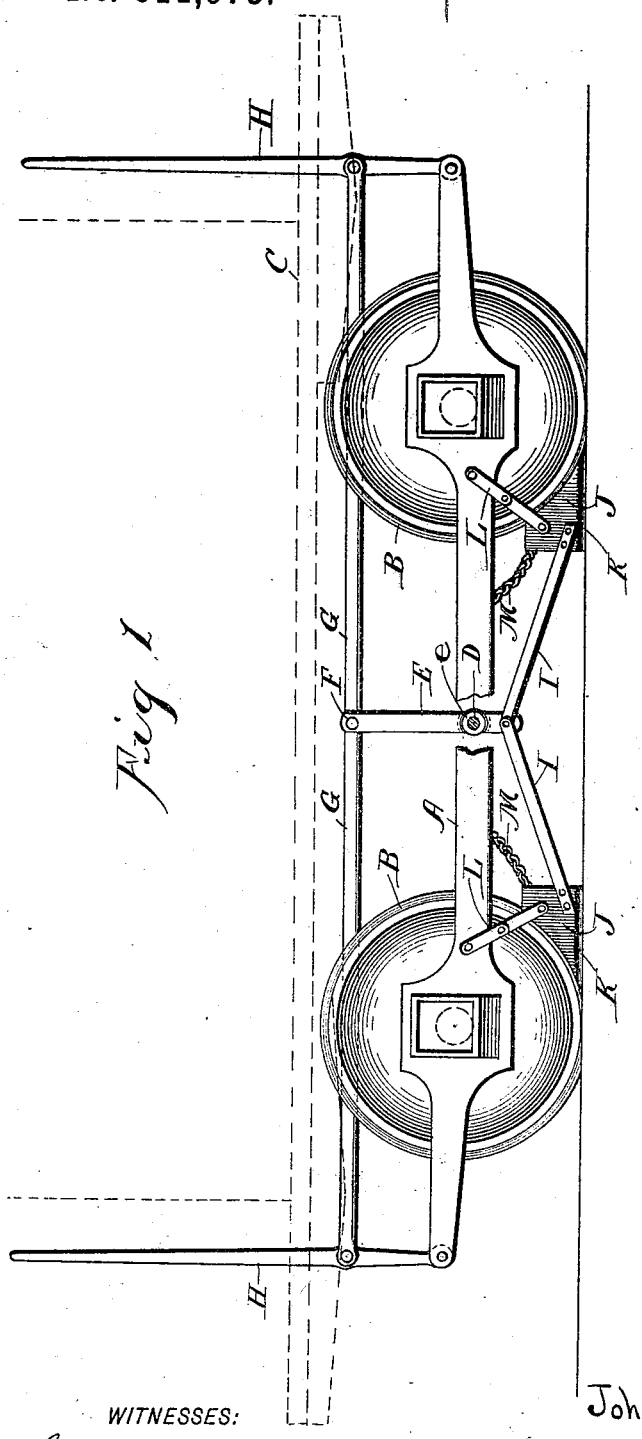
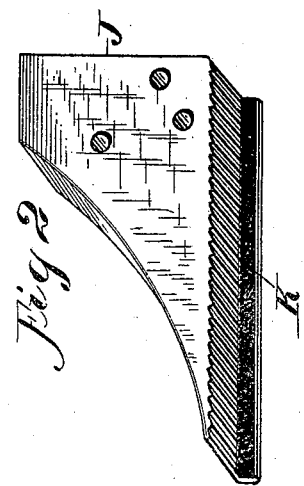
WITNESSES:
C. C. Burdine
J. M. Baldwin
John Fred Stevens, INVENTOR
BY Crosby and Dorian
ATTORNEYS

UNITED STATES PATENT OFFICE.

JOHN FRED STEVENS, OF OTTUMWA, IOWA, ASSIGNOR OF ONE-HALF TO JOHN PHILLIP ULLRICH, OF SAME PLACE.

CAR-BRAKE.

SPECIFICATION forming part of Letters Patent No. 511,973, dated January 2, 1894.

Application filed April 21, 1893. Serial No. 471,267. (No model.)

*To all whom it may concern:*

Be it known that I, JOHN FRED STEVENS, a citizen of the United States, residing at Ottumwa, in the county of Wapello and State of Iowa, have invented certain new and useful Improvements in Car-Brakes; and I do hereby declare the following to be a full, clear, and exact description of the invention, such as will enable others skilled in the art to which it appertains to make and use the same.

This invention relates to an improvement in car brakes and it consists in the construction and arrangement of parts hereinafter described and definitely pointed out in the claims.

The aim and purpose of the invention is the provision of an improved combined track and wheel brake, and means for actuating the same which will be simple in construction, strong and durable and readily applied.

The invention is more especially adapted for use in connection with electrically propelled cars.

These objects are attained by the construction illustrated in the accompanying drawings wherein like letters of reference indicate corresponding parts both in the views and in which—

Figure 1 is a side elevation of a car body with the improvement applied, and Fig. 2 is a detail perspective view of a shoe.

In the drawings A represents the truck frame, B the wheels and C the car body.

Pivoted centrally between the wheels on a cross bar D are rocking levers E, the same being mounted on the bar by having suitable hubs *e* formed at their centers through which the bar passes. These levers are located respectively on opposite sides and are connected at their upper ends with bars F, which have connected therewith at or near their centers the actuating rods G, extending to opposite ends of the car.

H, are the hand levers, pivoted at their lower ends to the base or truck frame, and connected above their pivots, with the rods G. Suitable means for holding the hand levers in their adjusted positions may be employed.

On the lower ends of the levers E are connected the links I, extending out in opposite directions and rigidly connected in the shoes J, at or near their bases. The shoes J, are formed of metallic blocks having flat under faces with serrations therein, and a curved upper end section adapted to fit the wheel, the apex or point being arranged between the wheel and track. On the inner edges of the bearing faces of the block are formed flanges K, which act as retainers for the shoes and also as means for preventing the derailment of the wheels.

L is the link connection between the shoe and truck frame and M is a stay chain, also connecting the shoes with the truck frames to prevent under swing.

In operation the hand lever is forced out drawing the upper end of lever E forward and forcing the lower end in the opposite direction thereby wedging the brake shoes at one end in between the track and wheel. When the brakes are off the shoes will counterbalance each other and in connection with the hand lever fasteners, will hold the shoes from contact with the wheels and track. By this means the use of springs are avoided. By this construction it will be readily seen that the brake mechanism may be readily applied to electric cars, as there is no large cumbersome frame needed which would interfere with the placement of the motor and other parts. It will be also seen that a very positive and powerful combined track and wheel brake is formed with the employment of the fewest possible number of parts.

It is evident that many minor changes in the construction and arrangement of the parts of the device can be made and substituted for those herein shown and described without in the least departing from the nature and principle of the invention.

Having thus described the invention, what is claimed as new, and desired to be secured by Letters Patent, is—

1. In a car, the combination with the wheels and frame, of vertically disposed levers pivoted on the frame, rods connected to the tops of the levers, and extending to the ends of the car, hand levers to which the rods are connected, brake shoes having track and wheel gripping faces, links rigid on the shoes and connected with the lower ends of the vertical levers and supports for the shoes, substantially as described.

2. In a car, the combination with the wheels and the truck frame of vertical levers pivoted on the frame between the wheels, actuating means connected with the tops of the levers, brake shoes having track and wheel braking faces, rigid links on the shoes extending up in opposite directions respectively from opposite wheels and pivotally connecting with the lower ends of the vertical levers and supporting links for the shoes, substantially as described.

In testimony whereof I affix my signature in presence of two witnesses.

JOHN FRED STEVENS.

Witnesses:
WM. MCNETT,
M. L. SANBORN.